(12) United States Patent
Mackie

(10) Patent No.: US 7,769,873 B1
(45) Date of Patent: Aug. 3, 2010

(54) DYNAMICALLY INSERTING FILTERS INTO FORWARDING PATHS OF A NETWORK DEVICE

(75) Inventor: Scott Mackie, Santa Cruz, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1053 days.

(21) Appl. No.: 10/281,446

(22) Filed: Oct. 25, 2002

(51) Int. Cl.
*G06F 15/16* (2006.01)
*G06F 15/173* (2006.01)
*G06F 7/04* (2006.01)
*G06F 17/30* (2006.01)
*G06F 9/00* (2006.01)
*G06F 17/00* (2006.01)
*H04L 29/06* (2006.01)
*H04L 9/32* (2006.01)

(52) U.S. Cl. .................. 709/229; 709/238; 713/154; 726/2; 726/3; 726/13

(58) Field of Classification Search ............. 370/351
See application file for complete search history.

(56) References Cited

U.S. PATENT DOCUMENTS

| | | | |
|---|---|---|---|
| 5,600,642 A | | 2/1997 | Pauwels et al. |
| 5,951,651 A | * | 9/1999 | Lakshman et al. .......... 709/239 |
| 6,147,976 A | * | 11/2000 | Shand et al. ............... 370/401 |
| 6,266,704 B1 | | 7/2001 | Reed et al. |
| 6,374,303 B1 | | 4/2002 | Armitage et al. |
| 6,477,166 B1 | | 11/2002 | Sanzi et al. |
| 6,493,349 B1 | | 12/2002 | Casey |
| 6,501,754 B1 | | 12/2002 | Ohba et al. |
| 6,507,914 B1 | | 1/2003 | Cain et al. |
| 6,553,028 B1 | | 4/2003 | Tang et al. |
| 6,731,652 B2 | | 5/2004 | Ramfelt et al. |
| 6,735,702 B1 | * | 5/2004 | Yavatkar et al. ............. 726/13 |
| 6,738,814 B1 | * | 5/2004 | Cox et al. .................. 709/225 |
| 6,751,218 B1 | | 6/2004 | Hagirahim et al. |

(Continued)

FOREIGN PATENT DOCUMENTS

JP 2005/130258 5/2005

(Continued)

OTHER PUBLICATIONS

Lougheed, K., A Border Gateway Protocol (BGP), Jun. 1990, RFC 1105, pp. 1-37.*

(Continued)

*Primary Examiner*—Hassan Phillips
(74) *Attorney, Agent, or Firm*—Shumaker & Sieffert, P.A.

(57) ABSTRACT

Techniques are described for dynamically inserting filters into a forwarding path of a router in response to a received filter description. For example, a first router may receive a generic filter description, and process the generic filter description to generate machine instructions executable by forwarding hardware. The forwarding hardware, which may be a forwarding engine or an interface card, executes the machine instructions to implement the dynamic filter. The router, for instance, may filter packet flows of a device sourcing a network disturbance, such as a denial of service (DoS) attack by applying the dynamic filter to the packet flows. The router may further forward the filter description to neighboring routers to filter the packet flows closer to the source.

27 Claims, 4 Drawing Sheets

U.S. PATENT DOCUMENTS

| | | | |
|---|---|---|---|
| 6,772,347 B1 * | 8/2004 | Xie et al. .................... | 726/11 |
| 6,778,531 B1 | 8/2004 | Kodialam et al. | |
| 6,807,182 B1 | 10/2004 | Dolphin et al. | |
| 6,876,657 B1 * | 4/2005 | Brewer et al. ............... | 370/401 |
| 6,879,594 B1 | 4/2005 | Lee et al. | |
| 6,920,503 B1 | 7/2005 | Nanji et al. | |
| 6,968,389 B1 | 11/2005 | Menditto et al. | |
| 7,035,226 B2 | 4/2006 | Enoki et al. | |
| 7,039,687 B1 | 5/2006 | Jamieson et al. | |
| 7,080,161 B2 | 7/2006 | Leddy et al. | |
| 7,082,102 B1 | 7/2006 | Wright | |
| 7,120,931 B1 * | 10/2006 | Cheriton .................... | 726/13 |
| 7,133,928 B2 | 11/2006 | McCanne | |
| 7,251,218 B2 | 7/2007 | Joregensen | |
| 7,269,135 B2 | 9/2007 | Frick et al. | |
| 7,281,058 B1 | 10/2007 | Shepherd et al. | |
| 7,299,296 B1 * | 11/2007 | Lo et al. .................... | 709/238 |
| 7,330,468 B1 | 2/2008 | Tse-Au | |
| 7,333,491 B2 | 2/2008 | Chen et al. | |
| 7,359,328 B1 | 4/2008 | Allan | |
| 7,360,084 B1 | 4/2008 | Hardjono | |
| 7,366,894 B1 | 4/2008 | Kalimuthu et al. | |
| 7,418,003 B1 | 8/2008 | Alvarez et al. | |
| 7,421,487 B1 | 9/2008 | Peterson et al. | |
| 7,463,591 B1 | 12/2008 | Kompella et al. | |
| 7,477,642 B2 | 1/2009 | Aggarwal et al. | |
| 7,483,439 B2 | 1/2009 | Shepherd et al. | |
| 7,519,010 B1 | 4/2009 | Aggarwal et al. | |
| 7,522,599 B1 | 4/2009 | Aggarwal et al. | |
| 7,522,600 B1 | 4/2009 | Aggarwal et al. | |
| 7,545,735 B1 | 6/2009 | Shabtay et al. | |
| 7,558,219 B1 | 7/2009 | Aggarwal et al. | |
| 7,558,263 B1 | 7/2009 | Aggarwal et al. | |
| 7,564,803 B1 | 7/2009 | Minei et al. | |
| 7,564,806 B1 | 7/2009 | Aggarwal et al. | |
| 7,570,604 B1 | 8/2009 | Aggarwal et al. | |
| 7,570,605 B1 | 8/2009 | Aggarwal et al. | |
| 2002/0071390 A1 | 6/2002 | Reeves et al. | |
| 2002/0101819 A1 * | 8/2002 | Goldstone .................. | 370/229 |
| 2002/0118644 A1 | 8/2002 | Moir | |
| 2002/0181477 A1 | 12/2002 | Mo et al. | |
| 2002/0186664 A1 | 12/2002 | Gibson et al. | |
| 2002/0191584 A1 | 12/2002 | Korus et al. | |
| 2002/0198687 A1 | 12/2002 | Dewan et al. | |
| 2003/0012215 A1 | 1/2003 | Novaes | |
| 2003/0014665 A1 | 1/2003 | Anderson et al. | |
| 2003/0021282 A1 | 1/2003 | Hospodor | |
| 2003/0031175 A1 | 2/2003 | Hayashi et al. | |
| 2003/0039248 A1 * | 2/2003 | Weaver ..................... | 370/392 |
| 2003/0043772 A1 | 3/2003 | Mathis et al. | |
| 2003/0056007 A1 | 3/2003 | Katsube et al. | |
| 2003/0063591 A1 | 4/2003 | Leung et al. | |
| 2003/0087653 A1 | 5/2003 | Leung et al. | |
| 2003/0088696 A1 | 5/2003 | McCanne | |
| 2003/0099235 A1 | 5/2003 | Shin et al. | |
| 2003/0112748 A1 | 6/2003 | Puppa et al. | |
| 2003/0123446 A1 | 7/2003 | Muirhead et al. | |
| 2003/0172114 A1 | 9/2003 | Leung | |
| 2003/0177221 A1 | 9/2003 | Ould-Brahim et al. | |
| 2003/0191937 A1 | 10/2003 | Balissat et al. | |
| 2003/0212900 A1 * | 11/2003 | Liu et al. ................... | 713/200 |
| 2004/0037279 A1 | 2/2004 | Zelig et al. | |
| 2004/0047342 A1 | 3/2004 | Gavish et al. | |
| 2004/0081154 A1 | 4/2004 | Kouvelase | |
| 2004/0151180 A1 | 8/2004 | Hu et al. | |
| 2004/0151181 A1 | 8/2004 | Chu et al. | |
| 2004/0190517 A1 | 9/2004 | Gupta et al. | |
| 2004/0218536 A1 | 11/2004 | Yasukawa et al. | |
| 2004/0240445 A1 | 12/2004 | Shin et al. | |
| 2004/0240446 A1 | 12/2004 | Compton | |
| 2005/0001720 A1 | 1/2005 | Mason et al. | |
| 2005/0018693 A1 | 1/2005 | Dull | |
| 2005/0097203 A1 | 5/2005 | Unbehagen et al. | |
| 2005/0108419 A1 | 5/2005 | Eubanks | |
| 2005/0111351 A1 | 5/2005 | Shen | |
| 2005/0169270 A1 | 8/2005 | Mutou et al. | |
| 2005/0220132 A1 | 10/2005 | Oman et al. | |
| 2005/0232193 A1 | 10/2005 | Jorgensen | |
| 2005/0262232 A1 | 11/2005 | Cuervo et al. | |
| 2005/0265308 A1 | 12/2005 | Barbir et al. | |
| 2005/0271035 A1 | 12/2005 | Cohen et al. | |
| 2005/0271036 A1 | 12/2005 | Cohen et al. | |
| 2005/0281192 A1 | 12/2005 | Nadeau et al. | |
| 2006/0013141 A1 | 1/2006 | Mutoh et al. | |
| 2006/0039364 A1 | 2/2006 | Wright | |
| 2006/0047851 A1 | 3/2006 | Voit et al. | |
| 2006/0088031 A1 | 4/2006 | Nalawade | |
| 2006/0126496 A1 | 6/2006 | Filsfils et al. | |
| 2006/0147204 A1 | 7/2006 | Yasukawa et al. | |
| 2006/0153067 A1 | 7/2006 | Vasseur et al. | |
| 2006/0164975 A1 | 7/2006 | Filsfils et al. | |
| 2006/0182034 A1 | 8/2006 | Klinker et al. | |
| 2006/0221958 A1 | 10/2006 | Wijnands et al. | |
| 2007/0036162 A1 | 2/2007 | Tingle et al. | |
| 2007/0098003 A1 | 5/2007 | Boers et al. | |
| 2007/0124454 A1 | 5/2007 | Watkinson | |
| 2007/0140107 A1 | 6/2007 | Eckert et al. | |
| 2008/0056258 A1 | 3/2008 | Sharma et al. | |
| 2008/0123524 A1 | 5/2008 | Vasseur et al. | |
| 2008/0123654 A1 | 5/2008 | Tse-Au | |
| 2009/0028149 A1 | 1/2009 | Yasukawa et al. | |

FOREIGN PATENT DOCUMENTS

| | | |
|---|---|---|
| JP | 2005/167482 | 6/2005 |
| JP | 2005/252385 | 9/2005 |
| KR | 2004/001206 A | 1/2004 |
| WO | 2004/071032 A1 | 8/2004 |

OTHER PUBLICATIONS

U.S. Appl. No. 10/431,395, entitled "Rate Limiting Data Traffic in a Network", filed May 8, 2003, Ross Callon et al.

U.S. Appl. No. 10/080,865, entitled "Distributed Filtering for Networks", filed Feb. 21, 2002, Ross Callon.

U.S. Appl. No. 10/235,455, entitled "Systems and Methods for Identifying Sources of Network Attacks", filed Sep. 5, 2002, Ben Eater, Rob Jaeger.

U.S. Appl. No. 10/234,455, entitled "Systems and Methods for Identifying Sources of Network Attacks", filed Sep. 5, 2002, Ben Eater, Rob Jaeger.

Gibson, Steve, "DRDoS—Description and Analysis of a Potent, Increasingly Prevalent, and Worrisome Internet Attack," Gibson Research Corporation, Feb. 2002, www.grc.com/dos/drdos.htm.

D. Awduche et al., "RFC 3209—RSVP-TE: Extensions to RSVP for LSP Tunnels," Network Working Group, Dec. 2001, 64 pgs. http://rfc.sunsite.dk/rfc/rfc3209html.

RSVP-TE: Resource Reservation Protocol—Traffic Extension, Javvin Company, 2 pgs, printed Apr. 18, 2005. http://www.javvin.com/protocolRSVPTE.html.

U.S. Appl. No. 11/056,383, entitled "Fast Reroute of Traffic Associated With a Point to Multi-Point Network Tunnel," filed Feb. 10, 2005.

U.S. Appl. No. 12/499,606, entitled "Point to Multi-Point Label Switched Paths With Label Distribution Protocol," filed Jul. 9, 2009.

U.S. Appl. No. 11/192,432, entitled "Transmission of Layer Two (L2) Multicast Traffic Over Multi-Protocol Label Switching Networks," filed Jul. 28, 2005.

U.S. Appl. No. 11/213,638, entitled "Shared Multicast Trees for Multicast Virtual Private Networks," filed Aug. 26, 2005.

U.S. Appl. No. 11/213,637, entitled "Aggregate Multicast Trees for Virtual Private Local Area Network (LAN) Service Multicast," filed Aug. 26, 2005.

U.S. Appl. No. 11/213,639, entitled "Exchange of Control Information for Virtual Private Local Area Network (LAN) Service Multicast," filed Aug. 26, 2005.

U.S. Appl. No. 11/213,640, entitled "Auto-Discover of Multicast Virtual Private Networks," filed Aug. 26, 2005.

B. Zhang and H. Mouftah, "A Destination-initiated Multicast Routing Protocol for Shortest Path Tree Constructions," GLOBECOM 2003, IEEE Global Telecommunications Conference, XP010677629, pp. 2840-2844.

Aggarwal et al., "Establishing Point to Multipoint MPLS TE LSPs," submitted to Internet Engineering Task Force (IETF) Feb. 11, 2007, pp. 1-15.

Yasukawa et al. "Requirements for Point to Multipoint extension to RSVP-TE," IETF, Oct. 2003, pp. 1-20.

Atlas et al., "MPLS RSVP-TE Interoperability for Local Protection/Fast Reroute," IETF, Jul. 2001, pp. 1-14.

Eric C. Rosen et al., "Multicast in MPLS/BGP IP VPNs," draft-rosen-vpn-mcast-07.txt, May 2004, 27 pgs.

Steven Deering et al., "Protocol Independent Multicast-Sparse Mode (PIM-SM): Motivation and Architecture," draft-ietf-idmr-pim-arch-05.txt, Aug. 4, 1998, 30 pgs.

K. Kompella et al., "Virtual Private LAN Service," draft-ietf-l2vpn-vpls-bgp-00.txt, May 2003, 22 pgs.

Y. Rekhter et al., "A Border Gateway Protocol 4 (BGP-4)," Mar. 1995, 72 pgs.

Satyanarayana et al., "Extensions to GMPLS RSVP Graceful Restart", draft-aruns-ccamp-restart-ext-01.txt, Jul. 2004, Network Working Group Internet Draft, p. 12.

* cited by examiner

DYNAMICALLY INSERTING FILTERS INTO FORWARDING PATHS OF A NETWORK DEVICE

TECHNICAL FIELD

The invention relates to computer networks and, more particularly, to techniques for filtering packets within computer networks.

BACKGROUND

A computer network is a collection of interconnected computing devices that exchange data and share resources. In a packet-based network, such as the Internet, the computing devices communicate data by dividing the data into small blocks called packets. The packets are individually routed across the network from a source device to a destination device. The destination device extracts the data from the packets and assembles the data into its original form. Dividing the data into packets enables the source device to resend only those individual packets that may be lost during transmission.

Certain devices within the network, referred to as routers, maintain tables of routing information that describe available routes through the network. Each route defines a path between two locations on the network. Upon receiving incoming data packets, packet filters within the router compares header information, data, or both, contained by the packet to filtering rules of the filter to determine the fate of the packet. The filtering rules may specify, for example, particular source Internet Protocol (IP) address, destination IP addresses, protocol type, port number and other criteria for filtering packets. When the router identifies a packet that matches any of the filtering rules, the router performs an associated action to the packet depending on which filtering rule the packet matches. The action may include, for example, dropping the packet, remarking the packet as lower priority, counting packets that match the filtering rule, and the like. When the header information does not match any of the filtering rules the router identifies the destination for the packet according to the header information. Based on the header information, the router accesses one of the routing tables, selects an appropriate route for the packet and forwards the packet accordingly.

In general, a conventional router inserts static packet filters. The router may, for example, retrieve a description of the static filter from a configuration file and insert the static filter into a forwarding path of the router. For instance, the router may retrieve the description and insert the static filter upon startup or reboot of the router. Consequently, modification of the filters, such as insertion of a new filter or modification of existing filtering rules, typically requires updating the static configuration information of the configuration file and rebooting the router.

SUMMARY

In general, the invention is directed to techniques for dynamically inserting filters into a forwarding path of a routing device, such as a router, in response to a generic filter description exchanged between routing devices. A first router may, for example, forward a generic filter description to a second router. The first and second routers may exchange the generic filter description in accordance with a communication protocol, such as Border Gateway Protocol (BGP) or a filtering protocol. The second router receives the generic filter description, and processes the generic filter description to generate machine instructions specific for forwarding hardware within the router. The generic filter description includes filtering criteria that the router may apply to data, such as packets. For example, the filtering criteria of the generic filter description may include, for example, a source Internet Protocol (IP) address of a device causing the DoS attack. The router may use the specified source IP address to filter out packets from the device sourcing the DoS attack.

The machine instructions generated from the generic filter description may be, for example, applied by a central forwarding engine, or distributed to a set of intelligent interface cards for application to inbound or outbound packet flows. In either case, the forwarding hardware executes the machine instructions to apply the filters during the packet forwarding process. Consequently, the forwarding hardware may be viewed as implementing the filtering rules within the forwarding path of the router. As referred to herein, a "forwarding path" refers to the path a packet flow follows through the router from an input interface card to an output interface card. The forwarding hardware performs an associated action on packets of packet flows that match any of the filtering rules, and forwards packet that do not match any of the filtering rules in accordance with forwarding information. In this manner, the router dynamically inserts filters, referred to herein as "dynamic filters," into the forwarding path in response to exchanged filter descriptions.

The router may further forward the generic filter description with neighboring routers. For example, a first router may detect a network disturbance using traffic flow analysis, and generate a generic filter description to diffuse the network disturbance. The first router may forward the generic filter description to a second router and a third router, which are neighboring routers of the first router. The second and third routers may forward the generic filter description to neighboring routers. In this manner, routers exchange the generic filter description with other routers throughout a network. This results in filtering of packet flows near the source of the network disturbance. Instead of exchanging the generic filter description, the router may process the generic filter description to generate machine instructions, and exchange machine instructions with neighboring routers. In the case in which the router forwards the machine instructions to neighboring routers, the forwarding hardware of the routers must use similar low-level machine language.

The dynamic filters inserted into the forwarding path of the router may have a specified lifetime. In this manner, the router may maintain the dynamic filters for a specified amount of time, and remove the dynamic filters upon the expiration of that specified time. By only maintaining the dynamic filters for a specified amount of time, the router prevents the accumulation of dynamic filters that are no longer necessary, and prevent consumption of unnecessary resources.

In one embodiment, a method comprises receiving in a first network router a filter description from a second network router. The method further comprises dynamically inserting a filter in a forwarding path of the first network router in accordance with the received filter description. The method also includes filtering data flows of the forwarding path in accordance with the filter.

In another embodiment, a network router comprises a filter management process to receive a generic filter description from a neighboring router, and process the generic filter description to generate machine instructions for forwarding hardware within the network router. The network router further comprises a processor within the forwarding hardware that executes the machine instructions to implement the filter.

In another embodiment, a method comprises receiving a generic filter description. The method further comprises processing the generic filter description to generate machine instructions. The method also includes executing the machine instructions to filter data of a forwarding path of a network device. The method further includes forwarding the generic filter description to neighboring network routers.

In another embodiment, the invention is directed to a computer-readable medium containing instructions that cause a processor to receive within a first network router a filter description from a second network router. The computer-readable medium further comprises instructions that cause the processor to dynamically insert a filter in a forwarding path of the first network router in accordance with the filter description. The computer-readable medium further comprises instructions that cause the processor to filter data flows of the forwarding path in accordance with the filter.

The invention may provide one or more advantages. For example, a router may implement a filter within a forwarding path of forwarding hardware in real time. For example, the router may implement a filter within the forwarding engine of a router. Further, the router may forward a generic filter description to neighboring routers throughout a network. Forwarding the generic filter description to neighboring routers may allow the routers to filter the data flows close to the source of a network disturbance.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
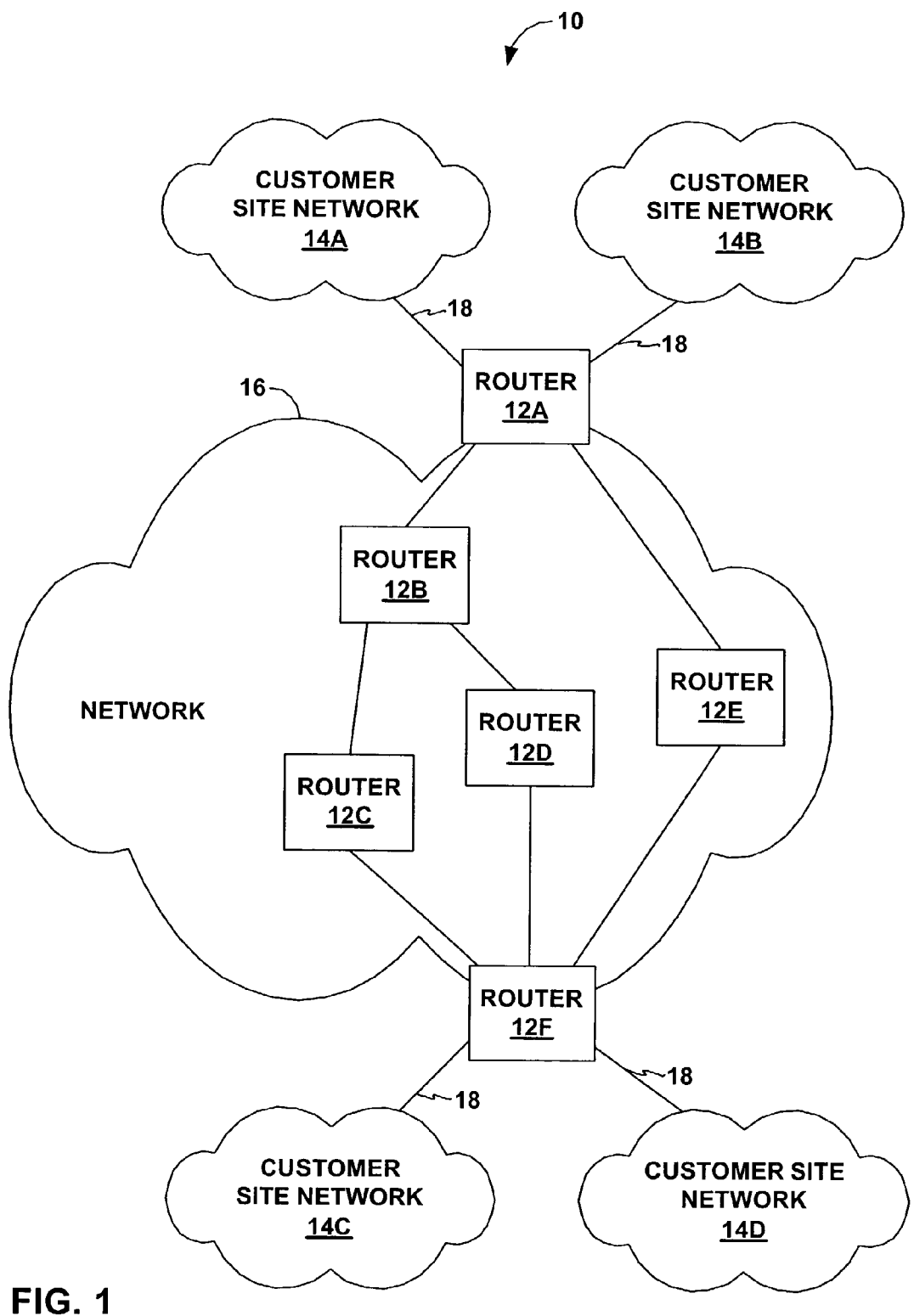
FIG. 1 is a block diagram illustrating an exemplary system in which routers dynamically filter data flows in accordance with the principles of the invention.

FIG. 1 is a block diagram illustrating an example system 10 comprising routers 12A-12F ("routers 12") that dynamically filter data, such as packets, in accordance with the principles of the invention. More specifically, routing devices, such as routers 12, may dynamically insert filters into the forwarding paths of packet flows to selectively filter matching packets. Routers 12 couple customer site networks 14A-14D ("customer site networks 14") to a public network 16. Public network 16 includes one or more autonomous systems (not shown) having a number of devices, such as routers 12 and switches (not shown), used to forward packets across public network 16.

Customer site networks 14 may be geographically distributed sites of multiple customers. Each of customer site networks 14 includes one or more devices (not shown), such as personal computers, laptop computers, handheld computers, workstations, servers, routers, switches, printers, fax machines, or the like. Customer site networks 14 may include one or more Local Area Networks (LANs), Wide Area Network (WANs), or the like. Although system 10 may include any number of customer site networks 14 coupled to public network 16 by any number of routers 12, FIG. 1, for simplicity, shows only customer site networks 14 coupled to public network 16 by routers 12. Each of customer site networks 14 connects to routers 12 via one or more access links 18.

In general, routers 12 may dynamically filter packet flows in response to exchanged filtering information, such as a generic filter description. For example, one of routers 12 may detect a network disturbance, such as a denial of service (DoS) attack, and generate a generic filter description. The generic filter description includes filtering criteria that routers 12 may use to diffuse the network disturbance. For example, the filtering criteria may include a source Internet Protocol (IP) address of a device causing the DoS attack. The receiving routers 12 may use the specified source IP address to filter out packets from the device causing a DoS attack.

To dynamically filter packet flows, routers 12 process the generic filter description to generate machine instructions specific to forwarding hardware within routers 12. For example, the machine instructions may be applied by central forwarding engines within routers 12, or distributed to a set of intelligent interface cards for application to inbound or outbound packet flows, depending on the particular architecture of each of routers 12. In either case, the forwarding hardware executes the machine instructions in order to apply the filters during the forwarding process. Consequently, the forwarding hardware may be viewed as implementing the filtering rules within the forwarding path of routers 12.

As referred to herein, a "forwarding path" refers to the path a packet flow follows through one of routers 12 from an input interface card to an output interface card. The forwarding hardware performs an associated action on packets that match any of the filtering rules, and forwards packets that do not match any of the filtering rules in accordance with forwarding information. In this manner, the router dynamically inserts filters, referred to herein as dynamic filters, into the forwarding path in response to newly developed filter descriptions, exchanged filter descriptions, or a combination thereof.

Routers 12 may further exchange generic filter description with neighboring routers 12. For example, one of routers 12, such as router 12A, may detect a network disturbance and generate a generic filter description. Router 12A may forward the generic filter description to routers 12B and 12E. Router 12B may forward the generic filter description on to routers 12C and 12D. In this manner, the generic filter description is exchanged between routers 12 throughout public network 16. This results in filtering of packet flows near the source of the network disturbance. Instead of exchanging the generic filter description, routers 12 may process the generic filter description to generate machine instructions, and forward the machine instructions to neighboring routers 12. In the case in which routers 12 forward machine instructions to neighboring routers 12, the forwarding hardware of routers 12 must use the same low-level machine language.

The dynamic filters inserted into the forwarding path of routers 12 may have a specified lifetime, which may be specified in some manner, such as within the generic filter description. In this manner, routers 12 may maintain the dynamic filters for a specified amount of time, and remove the filters upon the expiration of the specified time. By only maintaining the dynamic filters for a specified amount of time, routers 12 prevent the accumulation of filters that no longer serve a purpose, and prevent consumption of unnecessary resources.

Figure 2:
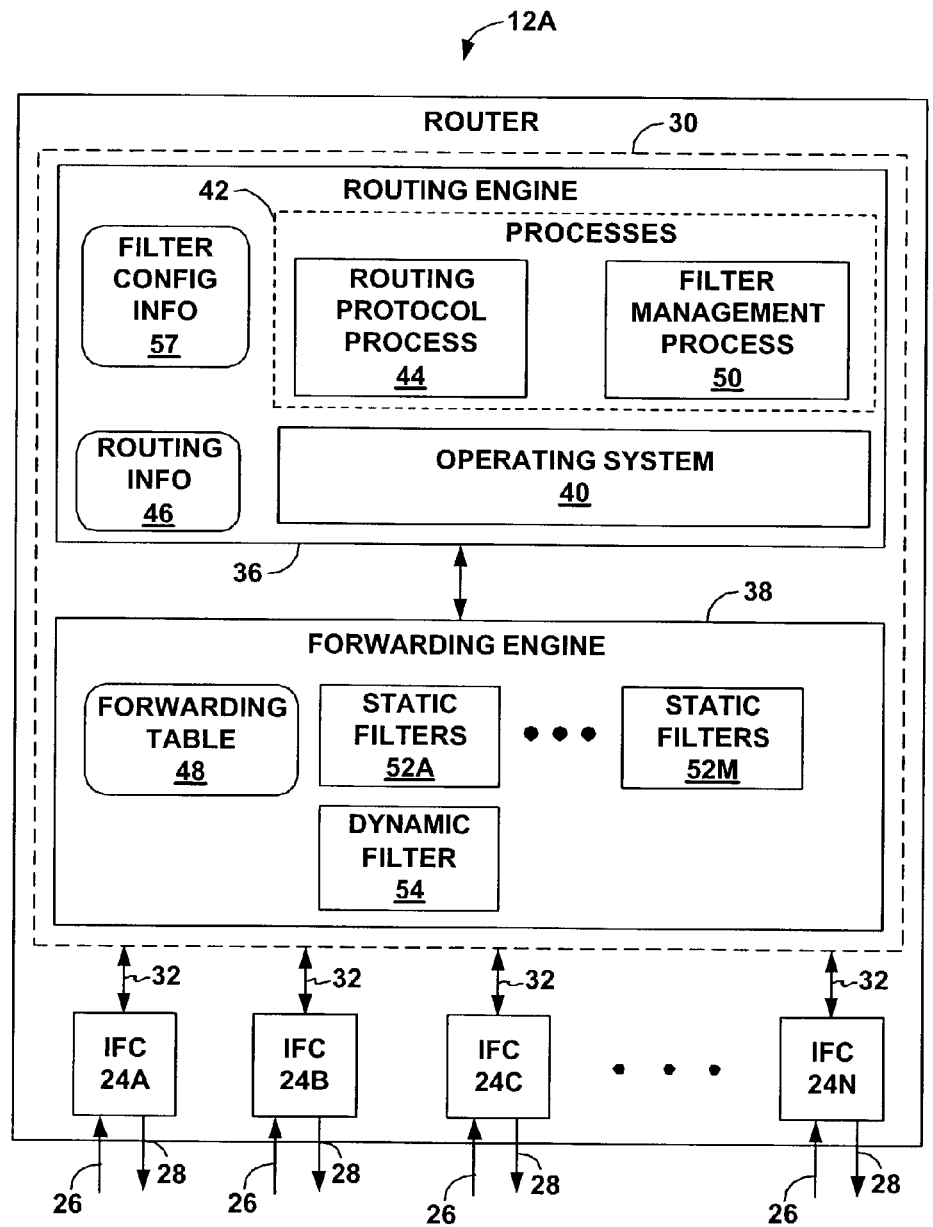
FIG. 2 is a block diagram illustrating an exemplary router that dynamically inserts filters into a forwarding path.

FIG. 2 is a block diagram illustrating an example one of routers 12, such as router 12A, that dynamically inserts filters into a forwarding path. Router 12A includes interface cards 24A-24N ("IFCs 24"), for receiving and sending data packets via network links 26 and 28, respectively. IFCs 24 are typically coupled to network links 26 and 28 via a number of interface ports (not shown). Each of IFCs 24 couples to a control unit 30 via at least one physical interface 32. Each physical interface 32 may correspond to one or more logical interfaces.

Control unit 30 may comprise a routing engine 36 and a forwarding engine 38. Routing engine 36 includes an operating system 40 that provides a multi-tasking operating environment for execution of a number of concurrent processes 42. An example of such an operating system is FreeBSD, which is an advanced UNIX operating system that is compatible with a number of programmable processors, including processors commercially available.

Processes 42 executing on operating system 40 may include a routing protocol process 44 that implements complex routing protocols and other functions. Routing protocol process 44 includes one or more threads that implement the various network protocols supported by routing engine 36. Routing protocol process 44 may include, for example, threads that implement protocols, such as Border Gateway Protocol (BGP), for exchanging routing information 46 with other routing devices and for updating routing information 46. Routing information 46 may describe a topology of public network 16, and more particularly, routes through public network 16. In particular, routing information 46 describes various routes within the network, and the appropriate next hops for each route, i.e., the neighboring devices of router 12A along each of the routes.

Routing engine 36 analyzes stored routing information 46 and generates at least one forwarding table 48 for forwarding engine 38. Forwarding table 48 may associate, for example, network destinations with specific next hops and corresponding IFCs 24. Forwarding table 48 need not be a table. For example, forwarding table 48 may be a link list, a radix tree, a database, a flat file, or various other data structures.

Processes 42 executing within routing engine 36 further include a filter management process 50 that manages the application of filters within router 12A. Filter management process 50 accesses filter configuration information ("FILTER CONFIG INFO") 57, and generates machine instructions to implement static filters 52A-52M ("static filters 52"). Filter management process 50 may, for example, implement static filters 52 upon startup or reboot. Static filters 52 define filtering rules that router 12A applies to packets of packet flows. Router 12A applies an associated action to packets that match any of the filtering rules. For example, router 12A may apply one of static filters 52 based on a variety of criteria, such as to packet flows destined for a particular one of customer site networks 14 in order to limit the customer to use of a specific amount of bandwidth. Router 12A may apply static filters 52 to packet flows of one of IFCs 24, corresponding physical or logical interfaces coupling IFCs 24 to control unit 30, a particular forwarding table 48, or the entire router 12A.

In addition, filter management process 50 provides for the dynamic insertion of filters, i.e., dynamic filters, into the forwarding path of the packet flows. In particular, filter management process 50 may, for example, receive a generic filter description. The generic filter description may, for example, provide a filter description in a format that conforms to a hardware-independent filtering protocol. The generic filter description may come from traffic analysis tools internal to router 12A or from a neighboring router. The generic filter description includes filtering rules to be applied to certain packets and packet flows. The filtering rules may specify, for example, particular source IP address, destination IP addresses, protocol type, port number and other criteria for identifying matching packets. The generic filter description may also include an action associated with each of the filtering rules. The associated action may include dropping the packet, counting the packet in order to maintain traffic statistics, sampling the packet to profile network traffic, remarking the packet with a lower priority, and relaying the packet to an alternate forwarding table. Further, the generic filter description may specify the amount of time to apply of the filter, e.g., a lifetime of the filter.

Filter management process 50 processes the input to produce machine instructions for implementation as dynamic filter 54. For example, filter management process 50 may include a compiler (not shown) that inputs a generic description, such as source code, and outputs machine instructions for the generic description. Filter management process 50 processes the hardware-independent filter description to generate low-level machine instructions capable of executing the desired instructions. Filter management process 50 communicates the machine instructions to forwarding hardware, such as forwarding engine 38, and directs forwarding engine 38 to apply the machine instructions to a particular forwarding path. Forwarding engine 38 executes the machine instructions, in turn, implementing dynamic filter 54. Router 12A may apply dynamic filter 54 to certain packets and packet flows of one of IFCs 24, corresponding physical or logical interfaces coupling IFCs 24 to control unit 30, a particular forwarding table 48, or the entire router 12A. Router 12A may further apply dynamic filter 54 to packet flows of router 12A for the specified amount of time. Filter management process 50 may also track the lifetime of dynamic filter 54. After the lifetime of dynamic filter 54 expires, router 12A issues commands directing forwarding engine 38 to remove dynamic filter 54 from the forwarding path.

Filter management process 50 further manages filter communication sessions with neighboring routers. For example, filter management process 50 may receive a generic filter description from a neighboring router. As described in detail above, the generic filter description indicates filtering rules to apply to packet flows. Filter management process 50 forwards the generic filter description to neighboring routers. For instance, filter management process 50 may generate a packet containing the generic filter description for each neighboring router, and forward the packet to the neighboring routers. In this manner, the generic filter description may be exchanged between routers throughout public network 16.

Router 12A may operate according to executable instructions fetched from a computer-readable medium. Examples of such media include random access memory (RAM), read-only memory (ROM), non-volatile random access memory (NVRAM), electrically erasable programmable read-only memory (EEPROM), flash memory, and the like. The functions of router 12A may be implemented by executing the instructions of the computer-readable medium with one or more processors, discrete hardware circuitry, firmware, software executing on a programmable processor, or a combination of any of the above.

Figure 3:
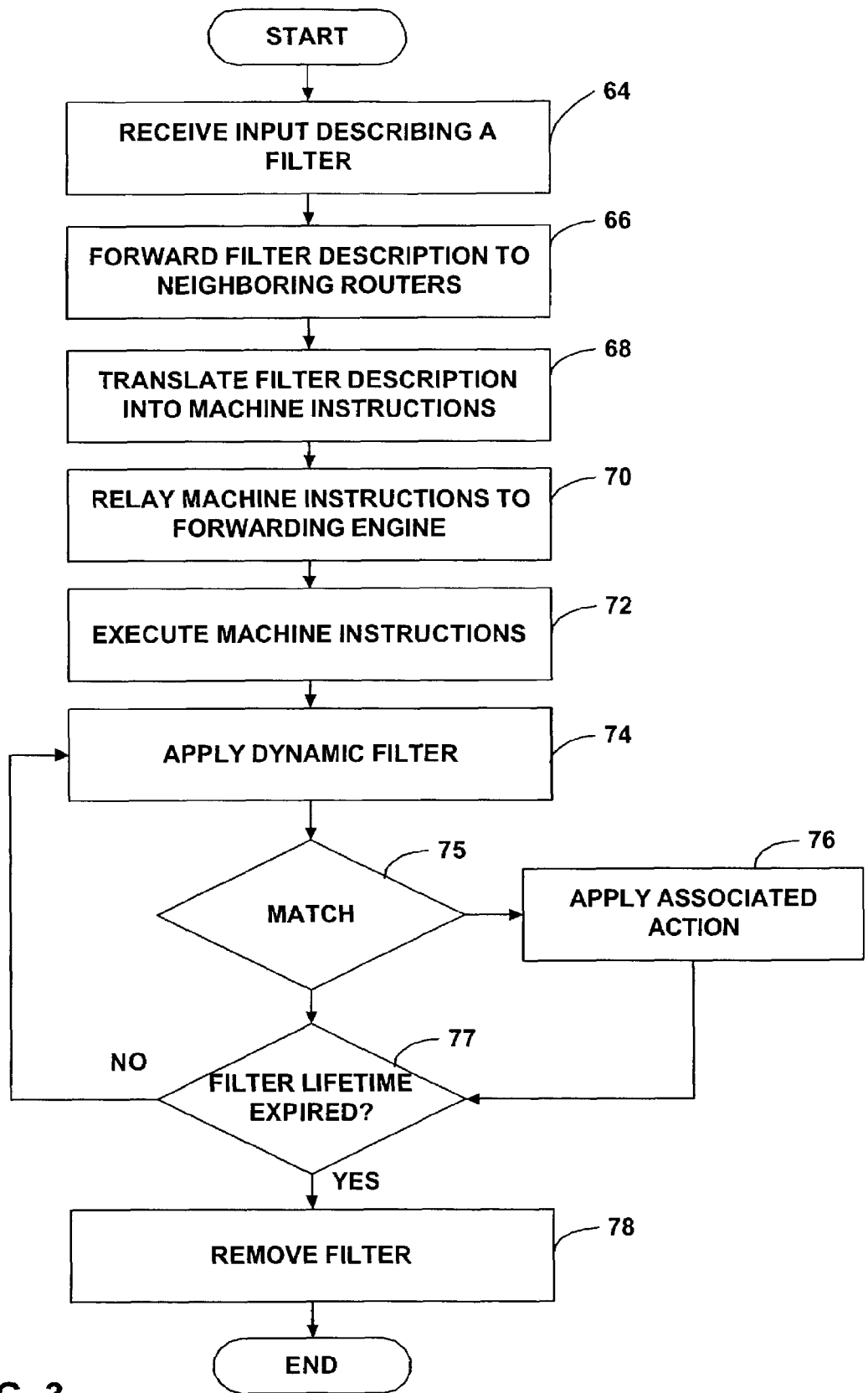
FIG. 3 is a flow diagram illustrating example operation of the router.

FIG. 3 is a is a flow diagram illustrating an example method employed by routers 12 to generate a dynamic filter, and insert the dynamic filter into a forwarding path of routers 12. Router 12A will be referred to for purposes of explanation, but any of routers 12 may implement the flow diagram of FIG. 3. Initially, router 12A receives a generic filter description (64). For example, router 12A may detect a network disturbance, such as a DoS attack, and generate a generic filter description in response to the network disturbance. Another example includes router 12A receiving the generic filter description from neighboring routers. The generic filter description received by router 12A may include filtering criteria, such as a source IP address, a bandwidth limit for packets that match the filtering criteria, and a specified length of time that router 12A applies the filtering criteria to packet flows. Alternatively, router 12A may automatically determine whether to dynamically insert and remove filters from the forwarding path. In this case, router 12A includes traffic analysis functions for analyzing received packet flows, and inserting and removing filters based on the results from the analysis. For example, router 12A may detect a DoS attack based on packet flow levels, and may automatically filter any suspicious packet flows.

Upon receiving the generic filter description, router 12A may forward the generic filter description to neighboring network devices (66). For example, router 12A may receive packets that contain the input filter description, and may forward the packets to neighboring routers 12A. This may be advantageous in allowing routers within a network to filter packet flows close to a source of network disturbances, thereby reducing network bandwidth consumed by the flows and minimizing the potential effects of the disturbances. For a DoS attack, for example, the routers may propagate the filter description until suspicious packet flows are filtered by routers or other network devices close to the source of the packet flows.

In addition to forwarding the generic filter description, router 12A implements the described filtering operation by processing the generic filter description to generate machine instructions (68). For example, the filter description received by router 12A may be hardware-independent. Consequently, filter management process 50 of router 12A may translate the hardware-independent filter description into low-level machine instructions for specific forwarding hardware, e.g. forwarding engine 38. Filter management process 50 relays the machine instructions to forwarding engine 38 (70). Forwarding engine 38 inserts dynamic filter 54 into the forwarding path, i.e., executes the machine instructions to apply the filter to received packets (72). Router 12A applies the filtering rules of dynamic filter 54 to packets and packet flows that enter router 12A (74). Router 12A may apply dynamic filter 54 to each packet flow that enters router 12A. Alternatively, router 12A may apply dynamic filter 54 to only a portion of the packet flows entering router 12A. Further, router 12A may either apply dynamic filter 54 to packet flows inbound to router 12A or to packet flows outbound from router 12A. Applying dynamic filter 50 to inbound packet flows, however, may be advantageous when packets are discarded upon matching filtering rules, and therefore does not have to use any resources to perform a lookup for the packet.

When packet information of one of the packets matches one of the forwarding rules of dynamic filter 54, forwarding engine 38 applies an associated action (76). For instance, router 12A may discard the packet. Alternatively, router 12A may mark the packet with a lower priority and continue to relay the packet along the forwarding path.

Filter management process 50 tracks the amount of time since dynamic filter 54 was inserted into the forwarding path to determine whether the lifetime of dynamic filter 54 has expired (77). When the lifetime of dynamic filter 54 has not expired, router 12A continues to filter the data flows in accordance with dynamic filter 54 along with any static filters 52. When the lifetime of dynamic filter 54 has expired, router 12A removes dynamic filter 54 from the forwarding path (78).

Figure 4:
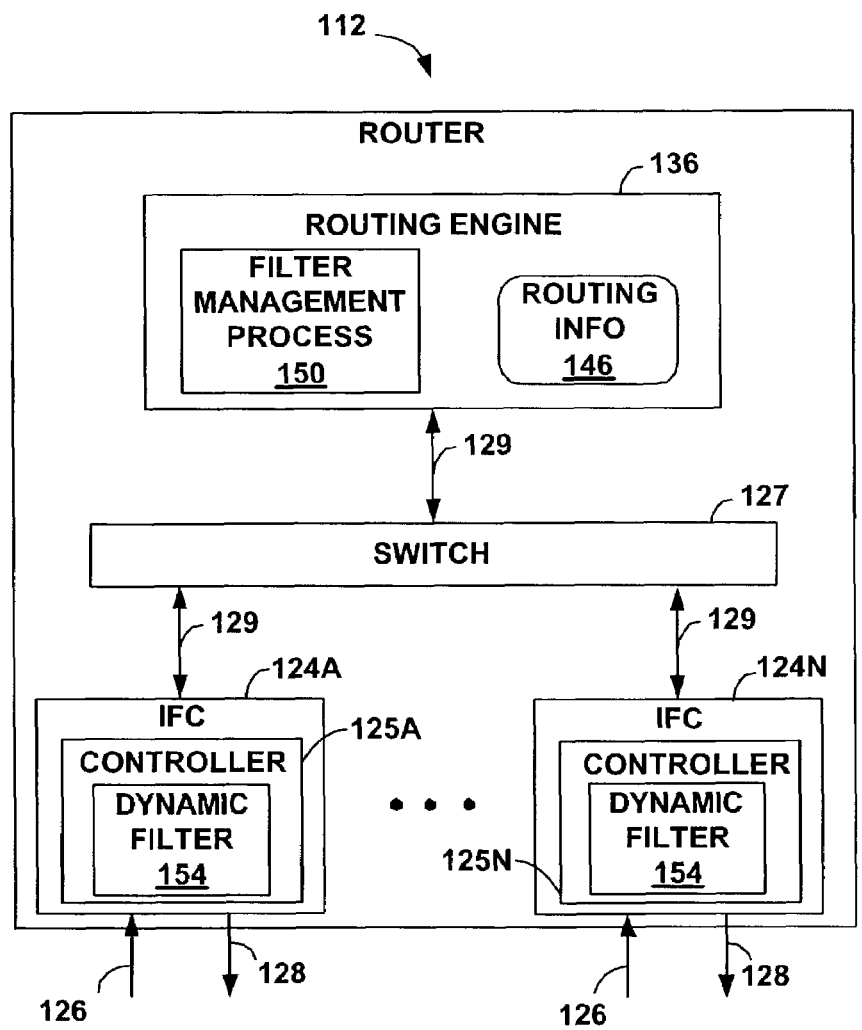
FIG. 4 is a block diagram illustrating another exemplary router.

FIG. 4 is a block diagram illustrating another exemplary router 112 that dynamically inserts filters into the forwarding path. Router 112 includes a routing engine 136 that maintains routing information 146 that describes the topology of public network 16. Routing engine 136 analyzes stored routing information 146 and generates forwarding information (not shown) for interface cards 124A-124N ("IFCs 124"). In other words, in contrast to the exemplary router 30 of FIG. 2, router 112 does not include centralized forwarding hardware. In particular, router 112 distributes the forwarding functionality to IFCs 124.

IFCs 124 receive and send data packets via network links 126 and 128, respectively, and are interconnected by a high-speed switch 127 and links 129. Switch 127 may comprise, for example, switch fabric, switchgear, a configurable network switch or hub, and the like. Links 129 may comprise any form of communication path, such as electrical paths within an integrated circuit, external data busses, optical links, network connections, wireless connections, and the like. IFCs 124 may be coupled to network links 126, 128 via a number of interface ports (not shown). IFCs 124 comprise a controller 125 that forwards packets in accordance with forwarding information generated by routing engine 136.

Routing engine 136 further includes a filter management process 150 that manages filtering within routers 12. Filter management process 150 receives a generic filter description, translates the generic filter description into machine instructions, and relays the machine instructions to controller 125 of at least one of IFCs 124 for implementation as dynamic filters 154. In particular, controllers 125 execute the machine instructions from filter management process 150 to implement dynamic filters 154 and apply the defined operation to received packets.

In addition, controller 125 determines the next hop for each of the packets from the distributed forwarding information, identifies a corresponding IFC 124 associated with the next hop, relays the packet to the appropriate IFC 124 via switch 127 and links 129. Controller 125 of the selected IFC 124 receives the outbound packet from switch 127, applies any filters associated with the outbound interface, and forwards the packet through an outbound link 128.

Various embodiments of the invention have been described. These and other embodiments are within the scope of the following claims.

The invention claimed is:

1. A method comprising:
    executing a routing protocol process on a processor of a first network router;
    receiving, with the routing protocol process, routing communications from a second router in accordance with a routing protocol, wherein the routing communications from the second router specify routing information that informs the first network router of routes to a plurality of network destinations within a network, and wherein at least one of the routing communications further specifies a hardware-independent filter description, the filter description including: (1) at least one filtering rule specifying filtering criteria for identifying packets, and (2) an action to be applied to packets matching the filtering criteria;
    processing the routing information with the routing protocol process to generate forwarding information for forwarding hardware of the first network router, wherein the routing protocol process analyzes the routes received by the routing protocol and generates the forwarding information to associate each of the network destinations with specific next hops;
    dynamically inserting a filter within a packet forwarding path of the forwarding hardware of the first network router in accordance with the received filter description, wherein the forwarding hardware is communicatively coupled to the processor of the first network router;

applying the action included in the filter description to packets matching the filtering criteria to filter packets in the forwarding hardware in accordance with the filter; and forwarding packets in accordance with forwarding information that is generated from the routing information.

2. The method of claim 1 wherein dynamically inserting a filter in the forwarding hardware of the first network router comprises:

processing, with the filter management process executing on the processor, the hardware-independent filter description to generate hardware-specific machine instructions for the forwarding hardware coupled to the processor; and communicating the hardware-specific machine instructions to the forwarding hardware.

3. The method of claim 2, wherein applying the action included in the filter description comprises executing, within the forwarding hardware, the machine instructions received from the filter management process executing on the processor to apply the action included in the filter description.

4. The method of claim 1, wherein the filtering criteria includes at least one of a source IP address, a destination IP address, a protocol type, and a port number.

5. The method of claim 1, wherein applying the associated action to data matching the filtering criteria includes at least one of dropping data, counting the data, sampling the data, marking the data with a lower priority, and forwarding the data along a different forwarding path.

6. The method of claim 1, further comprising forwarding the filter description to neighboring network routers.

7. The method of claim 1, further comprising:
detecting a network event within the second network router; and
generating the filter description in response to detecting the network event.

8. The method of claim 1, further comprising filtering the data with a static filter.

9. The method of claim 1, wherein the routing protocol is the Border Gateway Protocol (BGP).

10. A network router comprising:
a routing engine having a processor that includes:
a routing protocol process executing on the processor that receives routing communications from a second router in accordance with a routing protocol, wherein the routing communications from the second router specify routing information that describes routes to a plurality of network destinations within a network and specify a hardware-independent filter description, the filter description including: (1) at least one filtering rule specifying filtering criteria for identifying packets, and (2) an action to be applied to packets matching the filtering criteria, and wherein the routing protocol process analyzes the routes received by the routing protocol and generates forwarding information to associate each of the network destinations with specific next hops; and
a filter management process executing on the processor that processes the hardware-independent filter description to generate hardware-specific machine instructions for insertion within a forwarding path of forwarding hardware within the network router; and
forwarding hardware coupled to the processor that forwards packets in accordance with the forwarding information that is generated from the routing information, wherein the forwarding hardware executes the machine instructions received from the filter management process executing on the processor to apply the action to packets matching the filtering criteria to implement a filter within the forwarding hardware.

11. The network router of claim 10, wherein the forwarding hardware resides within a forwarding engine.

12. The network router of claim 10, further comprising:
two or more interface cards; and
two or more hardware-based controllers, wherein each of the controllers is located within a respective one of the interface cards,
wherein the hardware-based controllers receive the machine instructions generated by the processor of the routing engine and executes the machine instructions generated by the processor of the routing engine to apply the action to packets matching the filtering criteria to implement the filter.

13. The network router of claim 10, wherein the filtering criteria includes at least one of a source IP address, a destination IP address, a protocol type, and a port number.

14. The network router of claim 10, wherein the hardware-independent filter description further includes a lifetime of the filter.

15. The network router of claim 10, wherein the filter management process further forwards the hardware-independent filter description to two or more neighboring network routers.

16. The network router of claim 10, further comprising:
a set of static filters; and
wherein the network device filters data with filtering rules of the associated static filters and the dynamic filter.

17. The network device of claim 10, wherein the forwarding hardware comprises a hardware-based controller that executes the machine instructions generated by the processor of the routing engine to apply the action to packets matching the filtering criteria to implement the filter.

18. The network device of claim 10, wherein the routing protocol is the Border Gateway Protocol (BGP).

19. A method comprising:
receiving, with a routing protocol process executing on a processor of a network device, routing communications from a second router in accordance with a routing protocol, wherein the routing communications from the second router specify routing information that informs the first network router of routes to a plurality of network destinations within a network, wherein at least one of the routing communications further specifies a hardware-independent filter description, the filter description including: (1) at least one filtering rule specifying filtering criteria for identifying packets, and (2) an action to be applied to packets matching the filtering criteria;
processing the routing information with the routing protocol process to generate forwarding information for forwarding hardware of the first network router, wherein the routing protocol process analyzes the routes received by the routing protocol and generates the forwarding information to associate each of the network destinations with specific next hops;
receiving, with a filter management process executing on the processor of the network device, the hardware-independent filter description that includes at least one filtering rule specifying filtering criteria for identifying packets and an action to be applied to packets matching the filtering criteria;
processing, with the filter management process executing on the processor, the hardware-independent filter description to generate hardware-specific machine instructions for forwarding hardware coupled to the processor;

executing, within the forwarding hardware of the network device, the machine instructions received from the filter management process executing on the processor to apply the action to packets matching the filtering criteria to filter packets of a forwarding path of the network device;

forwarding packets with the forwarding hardware in accordance with forwarding information that is generated from the routing information; and forwarding the hardware-independent filter description to at least one neighboring network router.

20. The method of claim 19, wherein the filtering criteria includes at least one of a source IP address, a destination IP address, a protocol type, and a port number.

21. The method of claim 19, further comprising filtering the data with a static filter.

22. A computer-readable medium comprising instructions that cause one or more processors to:

execute a routing protocol process on a processor of a first network router;

receive, with the routing protocol process, routing communications from a second router in accordance with a routing protocol, wherein the routing communications from the second router specify routing information that informs the first network router of routes to a plurality of network destinations within a network, and wherein at least one of the routing communications further specifies a hardware-independent filter description, the filter description including: (1) at least one filtering rule specifying filtering criteria for identifying packets, and (2) an action to be applied to packets matching the filtering criteria;

process the routing information with the routing protocol process to generate forwarding information for forwarding hardware of the first network router, wherein the routing protocol process analyzes the routes received by the routing protocol and generates the forwarding information to associate network destinations with specific next hops;

dynamically insert a filter within a packet forwarding path of the forwarding hardware of the first network router in accordance with the received filter description, wherein the forwarding hardware is communicatively coupled to the processor of the first network router;

apply the action included in the filter description to packets matching the filtering criteria to filter packets in the forwarding hardware without modifying the routing information; and forward the packets in accordance with forwarding information that is generated from the routing information.

23. The computer-readable medium of claim 22, wherein the filter descriptions are hardware-independent, and wherein instructions that cause a processor to dynamically insert a filter in a forwarding path of the first network router includes instructions that cause the processor to:

process, with the filter management process executing on the processor, the hardware-independent filter description to generate hardware-specific machine instructions for the forwarding hardware coupled to the processor; and communicate the hardware-specific machine instructions to the forwarding hardware.

24. The computer-readable medium of claim 23, wherein the processor comprises a first processor, and wherein instructions that cause a processor to apply the action included in the filter description includes instructions that cause a second processor within the forwarding hardware to execute the machine instructions received from the first processor to apply the action included in the filter description.

25. The computer-readable medium of claim 22, further comprising instructions that cause a processor to forward the hardware-independent filter description to neighboring network routers.

26. The computer-readable medium of claim 22, further comprising instructions that cause a processor to:

detect a network event within the second network router; and generate the filter description in response to detecting the network event.

27. The computer-readable medium of claim 22, further comprising instructions that cause a processor to filter the data with a static filter.

* * * * *